Dec. 15, 1936.  F. A. FAHRENWALD  2,064,155

VALVE AND SEAT FOR INTERNAL COMBUSTION ENGINES

Filed June 26, 1933

Special Alloy — Special Heat Treatment

Inventor
Frank A. Fahrenwald
By Wilkinson, Huxley, Byron & Knight
Att'ys

Witness:
R. B. Davison

Patented Dec. 15, 1936

2,064,155

UNITED STATES PATENT OFFICE 2,064,155

VALVE AND SEAT FOR INTERNAL COMBUSTION ENGINES

Frank A. Fahrenwald, Chicago, Ill.

Application June 26, 1933, Serial No. 677,760

3 Claims. (Cl. 22—203)

This invention relates to valves and their seats used in the control of hot gases, for instance, the valves and seats of internal combustion engines and the like, and has for its object to provide an alloy bestowing special advantages when used in the production of such valve seats; a heat treatment for such alloy whereby these parts will be better adapted to withstand the destructive influences which they encounter in use; a method of developing such heat treatment; and a new finished article in the form of a special alloy valve seat embedded in a casting under conditions which bring the casting into better heat transfer, sustaining and assembly relation to the seat.

In the accompanying drawing, which illustrates parts in which the invention is embodied—

In said drawing, A represents the combustion chamber and B the exhaust passage of an internal combustion engine; and C represents the valve for closing and opening communication between said chamber and passage at times appropriate to the operative principle of the engine. Under earliest practice, the seat for the valve C was formed directly on the iron of the motor block surrounding the exhaust passage, by reaming out or chamfering the port into this passage appropriately to the shape of the valve, but the recent trend of automobile and similar engines to high speeds and high compression, with attendant high temperatures of exhaust gases and the heating of the engine parts with which such gases contact, has rendered obsolete the use of ordinary iron or steel for valves and their seats used for controlling engine compression and releasing the products of combustion to exhaust. Attempts have been made to alloy the entire block so as to harden the seat, but the resultant cost of the alloy and the increased difficulty of machining such metal in forming the valve seat, have rendered this method unfeasible.

Figure 1:
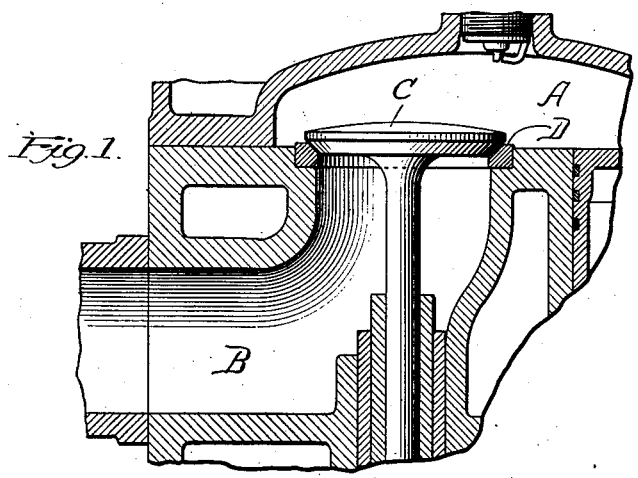
Figure 1 is a sectional view of a portion of an internal combustion engine block and its valve for controlling flow of hot gases from its combustion chamber to its exhaust passage.
Figure 2:
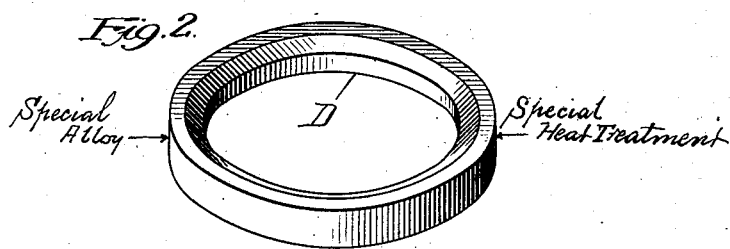
Figure 2 is a perspective view of a separately formed valve seat produced from the alloy and prepared for the heat treatment constituting a part of the present invention and incident to its assembly with the cylinder as illustrated in Figure 1.
Figure 3:
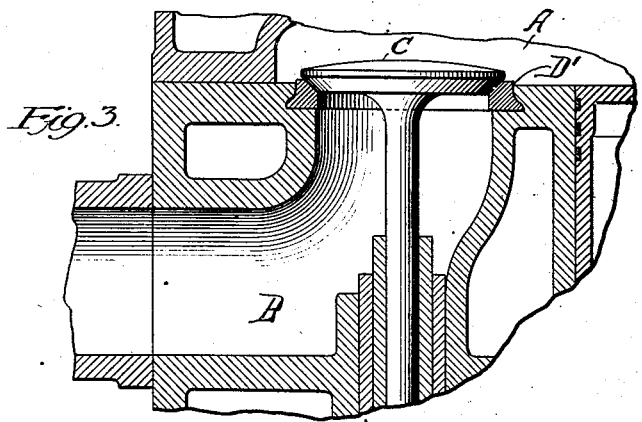
Figure 3 is a sectional view of a portion of an engine block having its exhaust passage equipped with a separately formed valve seat produced in accordance with the present invention, but of a form which bestows special advantages in the casting of the block around the ring.
Figure 4:
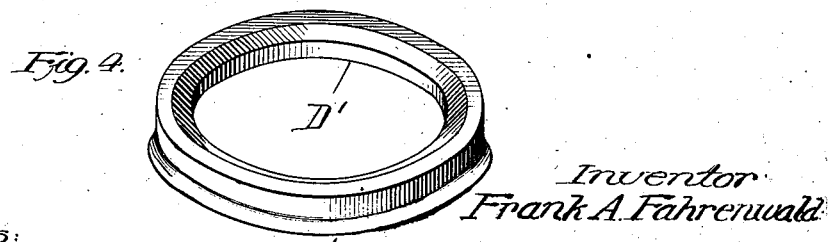
Figure 4 is a perspective view of the ring used in Figure 3.

The next step in meeting the new compression and temperature conditions was to provide a valve seat by inserting a ring of hard iron or alloy, such as shown at D in Figures 1 and 2 of the drawing, or D' in Figures 3 and 4. The form of ring shown in Figures 1 and 2 may be, and in accordance with the present invention is, assembled with a portion of the machine with which it is immediately concerned, for instance, the confines of a hot gas duct, by casting the machine around the ring. The form of rings shown in Figures 3 and 4 is of such section that it must be assembled with the gas duct in the same manner. This method of assembling valve seats with the confines of ducts which their valves are to control in service, is superior to assembly by forcing the ring into a cavity provided for its reception in an existing casting, both as to economy of production and superiority of assemblage after the ring is in place. Even where there is no undercut or overlap between the meeting faces of the ring and duct wall, the contraction of the cast metal upon the previously formed ring is such as to form a superior gastight connection, and when the coefficient of expansion of the two metals is substantially the same, there will be no danger of giving to the ring, under the heat of its service, the permanent set that will leave it loose when it cools. This left nothing to be desired except the provision of a material having characteristics which rendered it superior in meeting conditions of use.

Ideal characteristics of a material for use in making valves and separately formed valve seats for internal combustion engines (to be understood as included in the term "valve parts" as hereinafter used) are sufficient hardness and strength, both when cold and when at the maximum temperature attained in service, to resist the impact and peening effect of the pounding valve; resistance to erosion, particularly due to the cutting effect of hot gases "licking" past the the surfaces at the moment of partial opening and under high pressure and at high temperature; resistance to corrosion due to sulphur and other constituents of motor gases; stability against cracking under temperature fluctuations; a co-efficiency of heat expansion in the inserted ring substantially identical with that of the cylinder block in order to prevent cracking of the block by an excessive expansion of the ring, especially when the block is cast around a ring as shown at D' in Figure 3, or leaving the ring loose for leakage and dropping out if its rate of heat expansion be too low; and the material must have all its alloy constituents in equilibrium under both the highest and lowest temperatures which it encounters in use in order to prevent any phase adjustment which would alter hardness or cause warpage or dimensional changes.

The present invention supplies a material which answers to all of the above-enumerated qualifications.

The invention resides in a valve seat produced from an alloy of the chromium group of metals, with iron and carbon; iron being the base and chromium being introduced in sufficient proportion to resist scaling or corrosion at high temperature; molybdenum being added in sufficient proportion to insure hot hardness; and carbon being present in a proportion which gives great cold hardness and resistance to wear and erosion; said ingredients being proportioned to produce a valve seat having a coefficient of expansion substantially identical with that of the metal in which is formed the duct which is to be controlled by the valve cooperating with the said seat. The invention further resides in a structural organization composed of confines of the said duct, and a separately formed valve seat of the kind described united with the confines of the duct by casting the latter around the valve ring.

The alloy of the present invention will vary in proportions depending on the use to which it is put. The limits of its proportions will be, approximately, chromium from 6% to 15%, molybdenum from 1% to 8%, carbon from 1.5% to 3.5%, and the remainder iron, except for such ingredients commonly found existing in iron, and which may be present in immaterial proportions. An alloy containing the ingredients named in proportions within the limits stated will be hard and unforgeable in all ranges and must be produced in nearly the required form or design by casting, followed by grinding to exact size. As cast, the alloy will have a Brinell hardness of around 400, but this may be increased or decreased by heat treatment or by adjusting the carbon content.

It is assumed that temperatures as high as 1200° F. will be encountered by the alloy in service. Motor manufacturers specify, for materials in making valve parts, a minimum given hardness cold, and another minimum hardness at 1000° F., and further specify that these hot and cold hardness figures remain unchanged after sustained repeated fluctuations of temperature within these limits.

During repeated attempts to stabilize the alloy of the present invention within the conventional temperature range stated, by the various methods of heat treatment in common use, namely, by quenching, tempering, normalizing, etc., I have discovered what I term an ageing hardening treatment which has a profound and lasting effect on this alloy and one which not only places the alloy in a condition of phase equilibrium under all motor operating temperatures, but which greatly improves the general physical properties of the alloy. For example, one heat of alloy of an analysis coming within the limits herein specified, had a Brinell hardness of 444 as cast; at 1000° F. it was 375 Brinell; upon cooling it attained a Brinell of 512; and each time it was heated and cooled its Brinell value shifted. Under oil quenching from 1650° F., it attained a Brinell hardness of 713. Then when heated to 1000° F. the Brinell became 416; upon again cooling, the Brinell became 652; and all these values likewise shifted with each heating and cooling. Finally, it was found that by holding the metal for two hours at 1250° F. the hardness values became set at 512 cold, and 375 at 1000° F.; and these figures were retained regardless of variations within the range of from 0 to 1200° F.

The alloy of the experiments just referred to had a carbon content of 3.15%. With lower carbon, the long heat treatment will require somewhat higher temperature, say, up to 1400° F., but under the critical temperature in all cases.

The formula of the metal used in forming the seat ring necessitates its production by the process of casting and preferably, in all cases, the ring will be assembled with the cylinder block or other machine body by casting such machine body around the ring. This method of assembly of the ring, which is of relatively small mass, with a machine body of much greater mass, is productive of important advantages in that it affords economies in the assembly; effects an important heat treatment of the valve seat as an incident to the presence of the relatively large mass of molten metal, for instance, cast iron, at a temperature greatly in excess of the minimum heat treatment temperature for the alloy concerned; automatically introduces the feature of slow cooling of the ring from such heat treating temperature; and establishes an intimacy of contact between the sand-roughened surface of the precast ring and the cooling molten body in which it is embedded that subsequently affords superior heat transfer from the ring to the body through which the heat incident to use must be dissipated, besides holding the ring under stresses of compression during use and prolonging life under deteriorating influences of its use. While these considerations apply in an important degree to the form of ring shown in Figures 1 and 2, they apply in even greater measure to the form shown in Figures 3 and 4, where the meeting surfaces of the ring and cast metal body are materially greater; the compression embrace of the ring is greater; and the dissipation of heat from the ring to the body during use is facilitated.

Another phenomenon observed in subjecting the alloy of the present invention to the heat treatment of the present invention, is that the alloy changed from a magnetic condition that was only slight, to a magnetic condition that was very strong; also to conditions of hardness, toughness and greater wear resistance, due to precipitation of carbides or other ageing phenomena.

From the foregoing it will be seen that the present invention resides in a machine part or instrumentality which is subjected, when in use, to influences such as those encountered by valve parts of internal combustion engines, and which instrumentality contains, in addition to iron as its principal ingredient, other ingredients which adapt the part to withstand temperature incident to its use, as well as influences incident to such temperatures, and developing in said machine part a coefficient of expansion under heat, substantially the same as that of the metal constituting the machine in which the part is mounted; and which said machine part is assembled with the machine by casting around the previously formed machine part, the portion of the machine in which it is to be mounted; said additional ingredients constituting the machine part being preferably chromium in a proportion which is between 6% and 15%, molybdenum between 1% and 8%, and carbon between 1.5% and 3.5%; and which said alloy is, prior to putting it into service, subjected to a final treatment which includes the step of holding it for a prolonged time—typified by a duration of two hours—at a temperature which, while below the transformation temperature is up to a degree which would be typified by around 1250° F. for the alloy containing from 3% to 3.5% of carbon, or a temperature typified by around 1450° F. for the alloy when its carbon content is approximately 1.5%.

While I have disclosed an automobile valve and its seat as illustrative of the valve parts to which the invention is particularly applicable, it will be understood that there are other valves used in the industries, in situations where similar influences are encountered, and to these valve parts the invention is likewise applicable.

I claim:

1. The process of producing machine bodies having ducts designed for valve control and high temperature uses, which consists in preforming a ring of an alloy consisting substantially of chromium from 6 to 15%, molybdenum from 1 to 8%, carbon 1.5 to 3.5% and the remainder iron; said alloy having a coefficient of expansion substantially corresponding to that of the metal which is to compose the machine body; casting the metal body about the ring and thereby heating the ring to a high temperature; and then permitting the metal body and the ring to cool together.

2. In combination, a machine body which encounters high temperatures in service, and a separately formed ring defining an opening in said machine body; said ring comprising a relatively small mass of an alloy consisting of chromium from 6 to 15%, molybdenum from 1 to 8%, carbon 1.5 to 3.5% and the remainder iron; said machine body comprising a relatively large mass of iron cast about said ring; said ring being continually under stresses of compression of an order developed by the contraction of the iron incident to its solidification and cooling around said ring; and the metal of said ring having the structural modification resulting from the subjection of metal of its aforesaid formula to slowly decreasing temperature from a degree approximating the fusing point of the iron body down to atmosphere and prolonged through the period required to cool the iron after its said pouring.

3. The combination set forth in claim 2, in which the metal of the ring also embodies the stability of hardness resulting from a subjection of metal of its aforesaid formula additionally and repeatedly to and slowly cooling it from a temperature that approximates but is materially less than its critical point.

FRANK A. FAHRENWALD.